July 16, 1968    A. R. GETZIN    3,392,846
UNIT FILTER ASSEMBLY
Filed Oct. 1, 1964    4 Sheets-Sheet 1
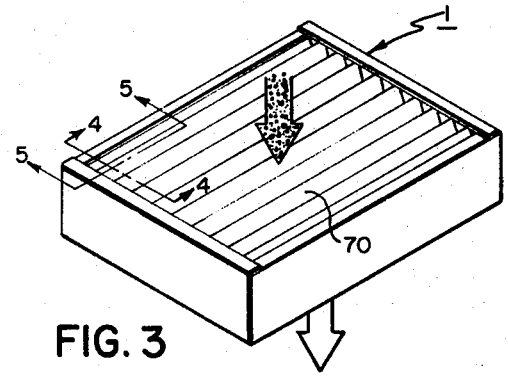
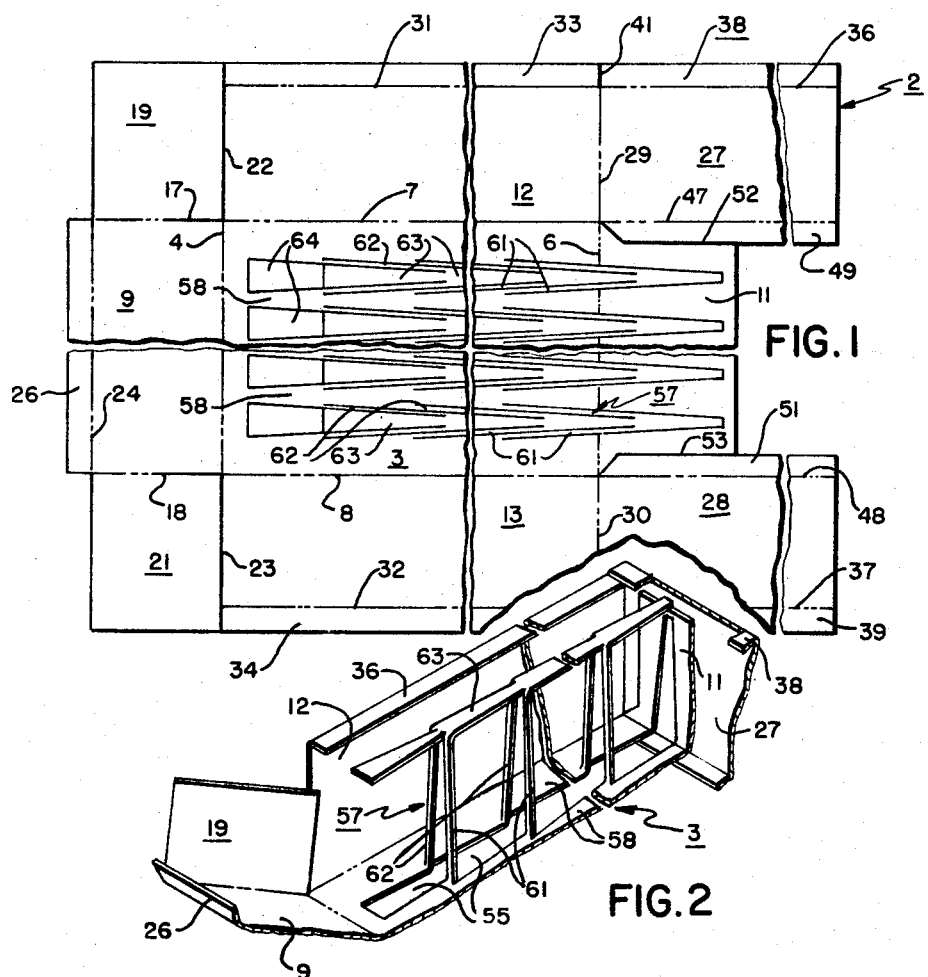
INVENTOR.
ALLAN R. GETZIN
BY
ATTORNEY July 16, 1968 A. R. GETZIN 3,392,846
UNIT FILTER ASSEMBLY
Filed Oct. 1, 1964 4 Sheets-Sheet 2
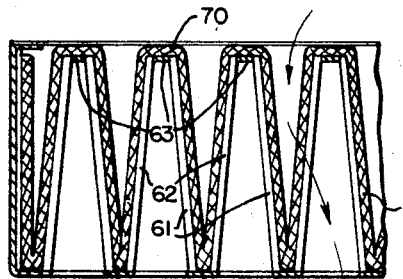
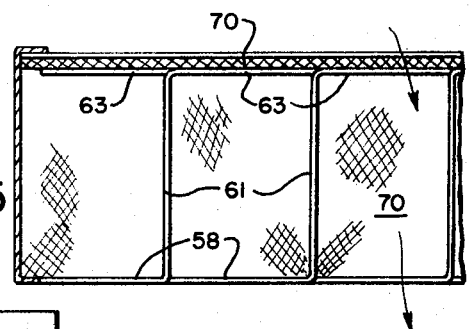
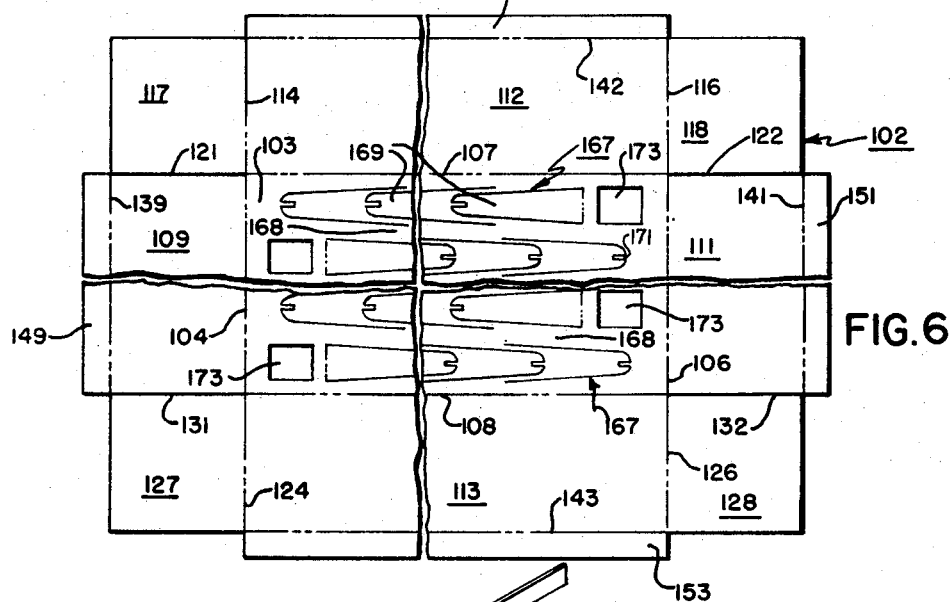
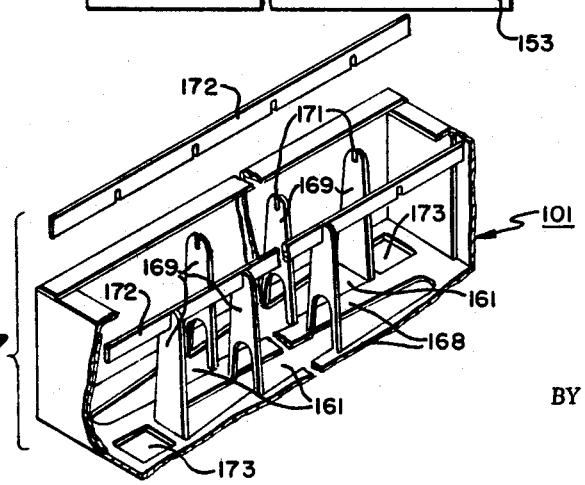
INVENTOR.
ALLAN R. GETZIN
BY
*Ralph G. Bruck*
ATTORNEY July 16, 1968 A. R. GETZIN 3,392,846
UNIT FILTER ASSEMBLY
Filed Oct. 1, 1964 4 Sheets-Sheet 3

INVENTOR.
ALLAN R. GETZIN

BY

*Ralph B. Bruck*
ATTORNEY

July 16, 1968 A. R. GETZIN 3,392,846
UNIT FILTER ASSEMBLY
Filed Oct. 1, 1964 4 Sheets-Sheet 4
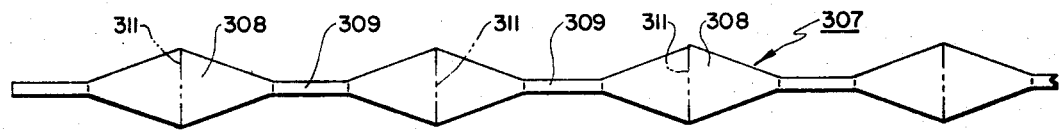
FIG. 16
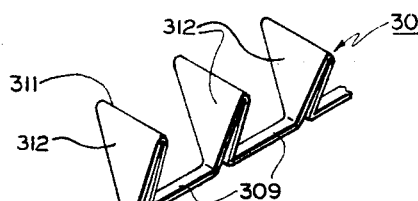
FIG. 17
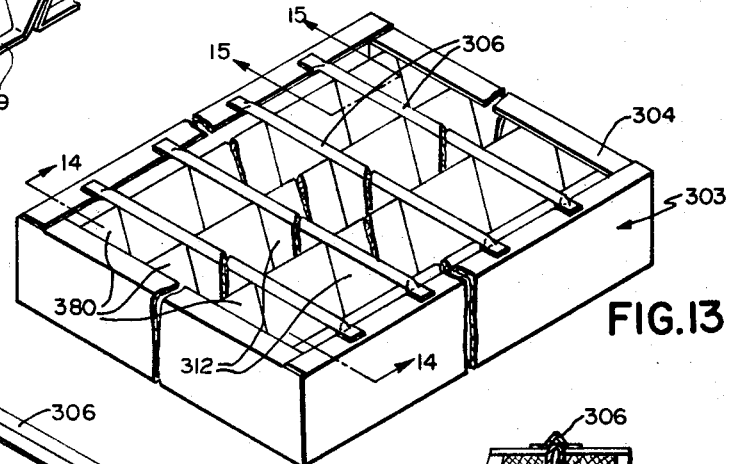
FIG. 13
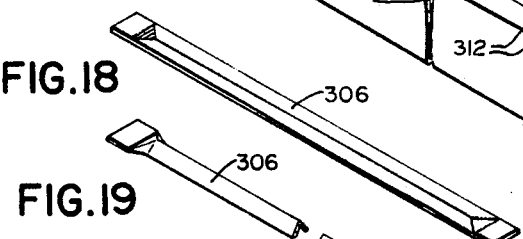
FIG. 18
FIG. 19
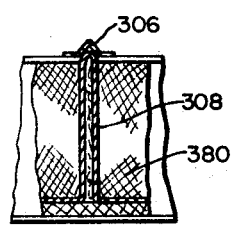
FIG. 15
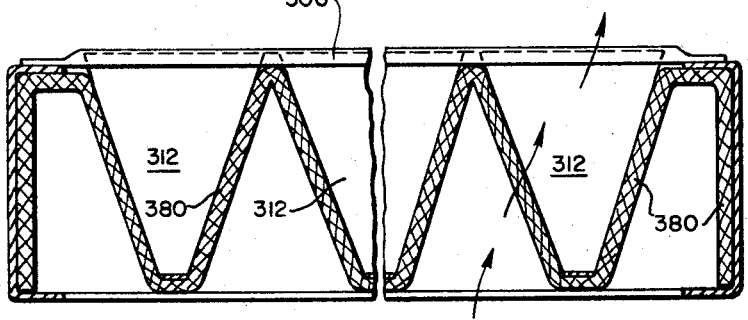
FIG. 14
*INVENTOR.*
ALLAN R. GETZIN
BY
*Ralph G. Brush*
ATTORNEY

United States Patent Office 3,392,846
Patented July 16, 1968

3,392,846
UNIT FILTER ASSEMBLY
Allan R. Getzin, Jeffersontown, Ky., assignor to American Air Filter Company, Inc., Louisville, Ky., a corporation of Delaware
Filed Oct. 1, 1964, Ser. No. 400,711
6 Claims. (Cl. 210—485)

ABSTRACT OF THE DISCLOSURE

A unit filter assembly including a flow-through frame, pleated filter media extending across the frame, and a rib support assembly for each pleat fixed to the downstream side of the frame and extending in tapered fashion toward the upstream side of the frame to support the crests and flanks of each pleat against the pressure of the fluid stream to be treated.

---

The present invention relates to unit filter assemblies and more particularly to improved disposable unit filter assembly arrangements to support filter medium in pleated fashion across fluid streams to be treated.

Various arrangements of unit assemblies for supporting filter medium in pleated fashion are known in the art, including arrangements which support the lateral sides of the pleats of filter medium against the pressure of a fluid stream to be treated by such medium. For the most part, these arrangements have been complex and expensive in their manufacture and assembly, requiring a substantial number of fluid impervious filter medium supports which have tended to increase fluid stream resistance and to reduce fluid filtering efficiency.

In accordance with the present invention, a novel unit filter assembly structure is provided which avoids these past disadvantages, the present invention providing a unit filter assembly which is straightforward and economical to manufacture and assemble, which can be readily installed with a minimum of steps, which affords a maximum support to pleated filter medium against the pressure of the fluid stream to be treated and which, at the same time, presents a minimum of resistance with a maximum of operating efficiency. In addition, the present invention provides a flow-through unit support frame for pleated filter medium which can be erected from an integral blank of sturdy, pliant material to further reduce manufacturing and assembly cost without sacrificing any of the aforementioned advantages.

Various other features of the present invention will become obvious to one skilled in the art upon reading the disclosure set forth hereinafter.

More specifically, the present invention provides a unit filter assembly comprising a flow-through frame including an upstream dirty fluid inlet and a downstream clean fluid outlet; a filter medium disposed in the frame between the inlet and the outlet in pleated form across the fluid stream to be treated; a first set of spaced substantially parallel rib members fixed to and extending between the walls of the frame adjacent the downstream clean fluid outlet; pleat contour means supported by the first set of rib members; the pleat contour means tapering inwardly toward the upstream crest of the pleats of the pleated filter medium in substantial contact with the downstream face of the lateral sides of the pleats to maintain the pleats in preselected tapered contour form against the pressure of the fluid stream to be treated; and a second set of spaced substantially parallel rib members supported by the pleat contour means to extend between the walls of the frame in nesting engagement with the downstream face of the crests of the pleats of the medium adjacent the upstream dirty fluid inlet.

It is to be understood that various changes can be made by one skilled in the art in the arrangement, form and construction of the filter assembly structure disclosed herein without departing from the scope or spirit of the present invention.

Referring to the drawings:

FIGURE 1 is a broken plan view of a blank sheet of material provided with appropriate score and fold lines to incorporate the features of the present invention;

FIGURE 2 is a partially set-up end portion of a blank sheet of FIGURE 1;

FIGURE 3 is a reduced upstream perspective of a fully set up, pleated medium supporting, unit filter assembly incorporating the features of FIGURES 1 and 2;

FIGURE 4 is an enlarged cross-sectional view of a portion of the assembly of FIGURE 3 taken in a plane passing through line 4—4 of FIGURE 3;

FIGURE 5 is a similarly enlarged cross-sectional view of the assembly of FIGURE 3, taken in a plane passing through line 5—5 of FIGURE 3;

FIGURE 6 is a broken view of a blank sheet of material provided with appropriate score and fold lines to incorporate features of a second embodiment of the present invention;

FIGURE 7 is a partially set up end portion of the blank sheet of FIGURE 6;

FIGURE 13 is a broken downstream perspective view of a unit filter assembly incorporating features of a fourth embodiment of the present invention;

FIGURE 14 is an enlarged cross-sectional view taken in a plane passing through line 14—14 of FIGURE 13;

FIGURE 15 is an enlarged cross-sectional view taken in a plane passing through line 15—15 of FIGURE 13;

FIGURE 16 is a plan view of a portion of a blank which forms one of the pleat contour support members of the unit assembly of FIGURE 13;

FIGURE 17 is a perspective view of the blank portion of FIGURE 16 in set-up arrangement;

FIGURE 18 is a perspective view of the upstream side of the support rod for the base portion of pleat contour support members such as that disclosed in FIGURES 16 and 17; and FIGURE 19 is a perspective view of the downstream side of the rod of FIGURE 18.

Figure 8:
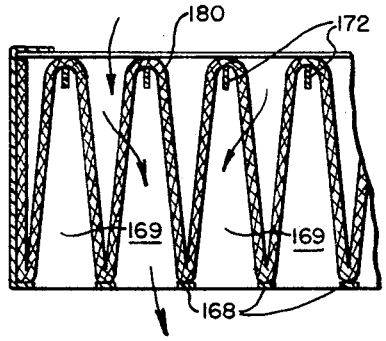
FIGURE 8 is an enlarged cross-sectional view of a portion of a unit filter assembly incorporating features of the assembly of FIGURES 6 and 7.
Figure 9:
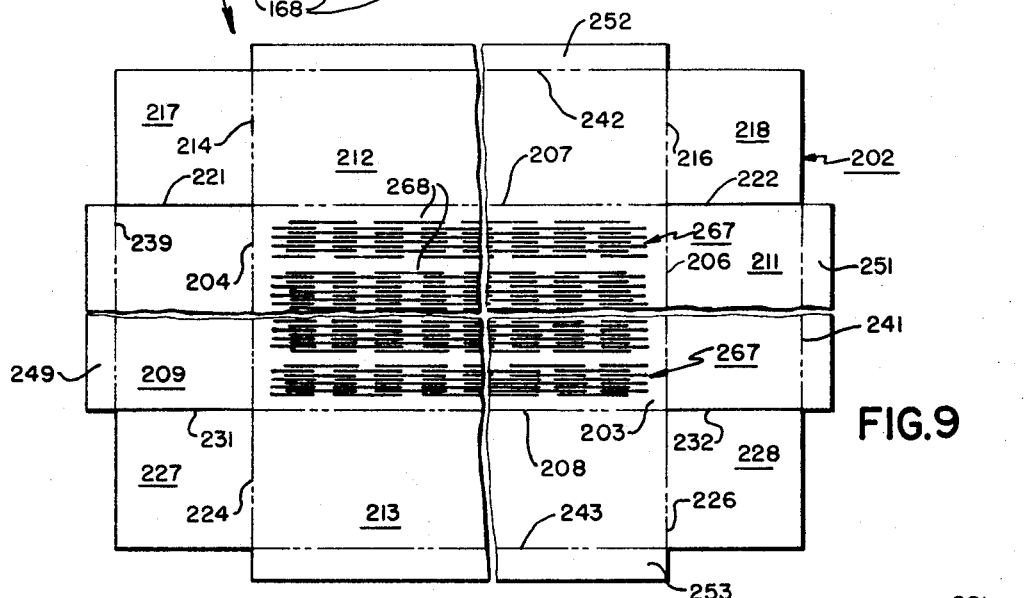
FIGURE 9 is a broken view of a blank sheet of material provided with appropriate score and fold lines to incorporate features of a third embodiment of the present invention.
Figure 10:
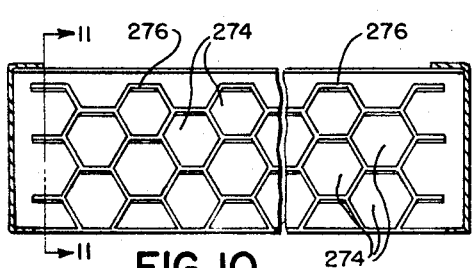
FIGURE 10 is an enlarged cross-sectional view of a unit frame assembly incorporating the features of the blank of FIGURE 9.
Figure 11:
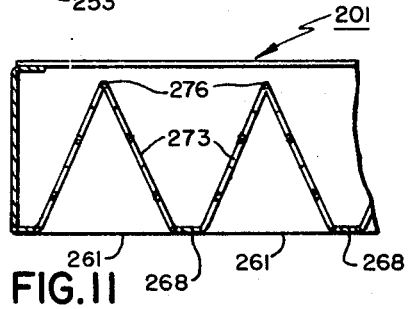
FIGURE 11 is a cross-sectional view of a portion of the frame of FIGURE 10 taken in a plane passing through line 11—11 of FIGURE 10.
Figure 12:
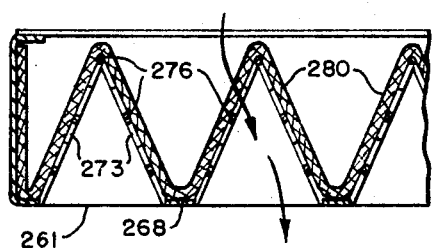
FIGURE 12 is a cross-sectional view like that of FIGURE 11 with the pleated filter medium in supported position and showing the direction of fluid flow.

As disclosed in FIGURE 1 of the drawings, the filter medium support frame of the unit filter assembly 1 of the present invention can be formed from an appropriately scored and lined integral blank 2 which can be of a sturdy, pliant, but inexpensive material such as cardboard or chipboard. Blank 2 includes rectangular face panel 3 bounded on its opposite side by pairs of spaced parallel fold lines 4, 6 and 7, 8 respectively, fold lines 7, 8 being normal to fold lines 4, 6. Extending from fold lines 4, 6 are opposed side walls 9, 11 respectively, and extending from fold lines 7, 8 are opposed side walls 12, 13 respectively.

It is to be noted that side wall 9 is bounded at its opposite extremities by fold lines 17, 18 which lines are aligned extensions of fold lines 7, 8 respectively. Extending from fold lines 17, 18 are overlap walls 19, 21 respectively, walls 19 and 21 being separated from walls 12, 13 by score lines 22, 23 respectively, which are aligned with fold line 4. Side wall 9 is further provided along its outer longitudinal edge with fold line 24 spaced from and parallel to fold line 4. Extending from such fold line 24 is border member 26.

In addition to overlap walls 19 and 21 which extend from side wall 9, side walls 12 and 13 also are provided with overlap walls 27, 28 respectively. Walls 27, 28 are separated from walls 12, 13 respectively by fold lines 29, 30 respectively, these fold lines 29 and 30 being aligned with and extensions of fold line 6. In a manner similar to wall 9, side walls 12 and 13 are provided along their outer longitudinal edges with fold lines 31, 32 respectively, spaced from and parallel to fold lines 7, 8. Extending from fold lines 31, 32 are border members 33, 34 respectively, and aligned with and extending from fold lines 31, 32 to determine overlap walls 27, 28 respectively, are fold lines 36, 37 respectively, these fold lines 36, 37 having border members 38, 39 respectively extending therefrom. Border members 38, 39 are separated from border members 33, 34 respectively by opposed score lines (only one of which is shown as 41). In addition to border members 38, 39 overlap walls 27, 28 respectively, are provided along their opposite edges with fold lines 47, 48 which are aligned with and are extensions of fold lines 7, 8 respectively. Extending from fold line 47, 48 are border members 49, 51 respectively. L-shaped score line 52, 53 serve to separate border members 49, 51 respectively, from side wall 11 of blank 2. As will be seen hereinafter, the structure so far described serves to form the border of the unit flow-through support frame.

To provide a plurality of flow-through passages 55 (FIGURE 2) in face panel 3 of a support frame and to provide a pleat contour support means to support the lateral sides of filter medium inserted into such a support frame, face panel 3 is scored in such a manner as to include a plurality of parallel sections 57 integral with and displaceable from face panel 3. The parallel sections 57 in blank 2 are defined by a first set of longitudinally extending, spaced substantially parallel rib members 58 which are integral with and extend between opposite side walls 9, 11 of blank 2. It is to be noted that parallel sections 57 are each in the form of a series of successive overlapping trapezoids with the longitudinally extending sides thereof scored in such a manner as to provide pleat contour means in the form of a set of spaced parallel rib pairs 61, 62. Rib pairs 61, 62 of each set are integral at their base portions with adjacent rib members 58 of the first set of rib members and each set of rib pairs 61, 62 serves to determine an intermediate strip of material 63 integral with the rib pairs of the set at the apex portion thereof. Each strip 63 serves to form one of a second set of spaced parallel rib members supported by pleat contour rib pair sets 61, 62 so as to extend between side walls 9, 11 of the blank 2 and so as to be nestable with the downstream face of the upstream crests of the filter medium to be supported. It is to be noted that at the extremity adjacent side wall 9 of each parallel section 57 from which the sets of pleat contour rib pairs 61, 62 and the second set of rib members 63 are formed, there is provided a trapezoidal punch-out 64. It further is to be noted that each parallel section 57 is scored to extend at its opposite extremity into side wall 11. The overlap walls 27, 28 aforedescribed and the border members 49, 51 serve to cover openings created by the scoring of the side wall 11 when blank 2 is set up into support frame form.

To assemble a unit support frame, it only is necessary to fold opposite side walls 9, 11 and 12, 13 into a position normal to face panel 3, overlap walls 19, 21 being folded into overlapping position with side walls 12 and 13, respectively, and overlap walls 27 and 28 being folded into overlapping and covering position with side wall 11. The trapezoidal punch-out sections 64 can then be removed and sections 57 displaced so that the sets of pleat contour rib pairs 61, 62 are placed into a position normal to the first set of rib members 58 and flow-through apertures 55 are formed in face panel 3. At this point, a continuous strip of suitable filter medium 70—for example, a filter medium of 50 FG fiber glass material—can be inserted in pleated form to be supported at its upstream crests by the second set of rib members 63, along its lateral sides by the sets of rib pairs 61, 62 and at its valleys by the first set of rib members 58. To prevent any bypassing of the fluid stream to be filtered, the edges and ends of filter medium 70 can be sealed to the inside walls of the support frame with the aid of some suitable adhesive known in the art. Once filter medium 70 has been appropriately inserted in pleated and supported form, upstream border members 26, 33, 34, 38 and 39 can be folded into proper position, as can downstream border members 49 and 51, if not already so folded. It is to be noted that throughout the setting-up operations suitable glue or staples can be employed where needed. Further, if desired, strips 63 can be fastened in the selected manner at their extremities to border member 26 at one set of ends and to border members 38, 39 at the opposite set of ends.

Referring to FIGURES 6–8 of the drawings, a second embodiment of the present invention is disclosed. As set forth in FIGURE 6, once again a unit support frame 101 of the invention can be formed from an appropriately scored and lined integral blank 102 which can be of a sturdy, pliant, but inexpensive material such as cardboard or chipboard. Blank 102 includes a rectangular face panel 103 bounded on its opposite sides by pairs of spaced parallel fold lines 104, 106 and 107, 108 respectively, fold lines 107, 108 being normal to fold lines 104, 106 respectively. Extending from fold lines 104, 106 are opposed side walls 109, 111 respectively, and extending from fold lines 107, 108 are opposed side walls 112, 113 respectively. It is to be noted that side wall 112 is bounded at its opposite extremities by fold lines 114, 116 respectively, which fold lines are aligned extensions of fold lines 104, 106 respectively. In like manner, side wall 113 is bounded at its opposite extremities by fold lines 124, 126 respectively, which fold lines are also aligned extensions in an opposite direction of fold lines 104, 106 respectively. Extending from fold lines 114, 116 are overlap walls 117, 118 respectively, which walls are separated from side walls 109, 111 by score lines 121, 122 respectively, score lines 121, 122 being aligned with fold line 107. Extending from fold lines 124, 126 are overlap walls 127, 128 respectively, which walls are separated from side walls 109, 111 by score lines 131, 132 respectively, score lines 131, 132 being aligned with fold lines 108. It is to be noted that side walls 109, 111, 112, 113 are provided along their outer longitudinal edge with fold lines 139, 141, 142 and 143, respectively, and extending from such fold lines are border members 149, 151, 152, 153 respectively. As will be seen hereinafter, the structure so far described serves to form the boundaries of the flow-through support frame 101.

To provide a plurality of flow-through passages 161, (FIGURE 7) in face panel 103 of the unit support frame 101 and to provide a pleat contour means to support the lateral sides of the pleated filter medium inserted into the unit frame, face panel 103 is scored to present a plurality of longitudinally extending spaced parallel sections 167 which are displaceable from the face panel 103 and which in blank form are defined by a first set of longitudinally extending, spaced substantially parallel rib members 168 integral with and extending between the opposite side walls 109, 111 of blank 102. In the embodiment of FIGURES 6 to 8 the parallel sections 167 are each in the form of blunted triangles scored to be separated from each other to provide a series of longitudinally extending aligned and spaced blunted triangular tabs 169. Each of tabs 169 is integral at its base portion with the first set of rib members 168 of face panel 103 and is displaceable therefrom to provide a pleat contour and support means which is inwardly tapering so as to contact the downstream face of the lateral sides of the pleats of filter medium to be supported by the unit frame. It is to be noted that tabs 169 are each provided with a slot 171, slots 171 of each section 167 being aligned to receive and support a rib member 172 of a second set of pleat supporting rib members. It further is to be noted that each of the spaced parallel sections 167 from which tabs 169 are formed is provided at one extremity with a rectangular punch-out 173, the successive parallel sections 167 being arranged in mirror image order to permit a more compact and aligned pleat contour and support arrangement.

To assemble the unit support frame assembly of FIGURES 6 to 8, it only is necessary to fold the opposite side walls 109, 111 and 112, 113 into position normal to face panel 103, the overlap walls 117, 118 and 127, 128 being folded into overlapping position with the respective side walls. The punch-out sections 73 can be removed and blunted triangular tabs 169 can be displaced so that the tabs are normal to ribs 168 and flow-through apertures 161 are formed. At this point, a continuous strip 180 of suitable filter medium—which also can be of 50 FG fiber glass material—can be inserted in pleated form to be supported at its upstream crests by the rib members 172 of the second set of rib members, these rib members having been inserted in the aligned slots 171 of the tabs. The pleats of the medium 180 are thus supported along their lateral sides by the edges of tabs 169 and at their valleys by the first set of rib members 168. To prevent any by-passing of the fluid stream to be filtered by filter medium 180, the edges and ends of the medium can be sealed to the inside wall of the frame with the aid of some suitable adhesive known in the art. Once the filter medium has been appropriately inserted, the upstream border members 149, 151, 152 and 153 can be folded over into position. It is to be noted that throughout the setting-up operations, suitable glue or staples can be used, if desired, and the rib members 172 can be fastened at their extremities to border members 149, 151 respectively.

Referring to FIGURES 9–12 of the drawings, a third embodiment of the present invention is disclosed. As set forth in FIGURE 9, unit support frame 201 of the invention can be formed from an appropriately scored and aligned integral blank 202 which can be of a sturdy, pliant, but inexpensive material such as cardboard or chipboard. The blank 202 in over-all appearance is substantially like the blank 102 as set forth in FIGURES 6 to 8. As such it includes rectangular face panel 203 bounded on its opposite side by pairs of spaced parallel fold lines 204, 206 and 207, 208 respectively, fold lines 207 and 208 being normal to fold lines 204, 206. Extending from fold lines 204, 206 are opposed side walls 209, 211 respectively, and extending from fold lines 207, 208 are opposed side walls 212, 213 respectively. It is to be noted that side wall 212 is bounded at its opposite extremities by fold lines 214, 216 respectively, which fold lines are aligned extensions of fold lines 204, 206 respectively. In like manner side wall 213 is bounded at its opposite extremities by fold lines 224, 226 respectively which fold lines are aligned extensions in an opposite direction of fold lines 204, 206 respectively. Extending from fold lines 214, 216 are overlap walls 217, 218 respectively, which walls are separated from side walls 209 and 211 by score lines 221 and 222 respectively, score lines 221 and 222 being aligned with fold line 207. Extending from fold lines 224, 226 are overlap walls 227, 228 respectively. Walls 227, 228 are separated from side walls 209, 211 by score lines 231, 232 respectively, score lines 231, 232 being aligned with fold line 208. It is to be noted that side walls 209, 211, 212 and 213 are provided along their outer longitudinal edges with fold lines 239, 241, 242 and 243, respectively, and extending from such fold lines are border members 249, 251, 252 and 253 respectively. As will be seen hereinafter the structure so far described serves to form the boundaries of the flow-through support frame 201.

To provide a plurality of flow through passages 261 in face panel 203 of the unitary assembly and to provide an apertured pleat contour means to support the lateral sides of the filter medium to be inserted in the unitary support assembly, face panel 203 is scored to present a plurality of longitudinally extending spaced parallel sections 267. Sections 267 are displaceable from panel 203 and, in blank form, are defined by a first set of spaced longitudinally extending, substantially parallel rib members 268 which are integral with and extend between the opposite side walls 209, 211 of blank 202. In the embodiment of FIGURES 9–12, parallel sections 267 are each scored in spaced parallel rows of longitudinally extending spaced and aligned slits with the slits of one row being offset from those of the immediate adjacent row so as to afford apertured expandable, lattice-like pleat contour supports 273. Pleat contour supports 273 are integral with rib members 268 of the face panel 203 and displaceable therefrom to provide inwardly tapering members which contact the downstream face of the lateral sides of the pleats of the filter medium to be supported thereby. The expandable, lattice-like pleat contour supports 273 with apertures 274 therein form at the apex portion thereof a second set of spaced parallel rib members 276 which nest with the downstream face of the crests of the pleats of the filter medium to be supported.

To assemble a unit support frame assembly of FIGURES 9–12, it only is necessary to fold the opposite side walls 209, 211 and 212, 213 in a position normal to face panel 203, the overlap walls 217, 218 being folded in overlapping position with side walls 209, 211 respectively, and the overlap walls 227 and 228 being folded into overlap position with side walls 209, 211 respectively. The scored sections 267 can then each be gripped along the central longitudinal axis thereof and pulled outwardly from the face panel 203 to form tapered pleat contour support sections 273 with apertures 274 and the second set of rib members 276. At this point, a continuous strip of suitable filter medium 280, which also can be a 50 FG fiber glass material, can be inserted in pleated form to be supported at its upstream crests by rib members 276, along its lateral sides by the tapered supports 273 and at its valleys by the rib members 268. To prevent any by-passing of the fluid stream to be filtered by filter medium 280, the edges and ends of medium 280 can be sealed to the inside wall of the support frame with the aid of some suitable adhesive known in the art. Once the medium hos been appropriately inserted, the upstream border members 249, 251, 252 and 253 can be folded over into proper operating position. It is to be noted that throughout the setting-up operation the sides and borders can be fastened by some suitable glue or by staples.

Referring to FIGURES 13 to 19 of the drawings, still a fourth embodiment of the present invention is disclosed. As set forth in this FIGURE 13, a unit support flow-through frame 303 is provided. Although not shown in detail, it is to be understood that frame 303 can be formed from a continuous strip of sturdy, pliant material such as cardboard or chipboard which has spaced fold lines defining the four adjacent side walls thereof as well as an overlap wall and which has downstream border member 304, as well as an upstream border (not disclosed). Simply by folding the side walls and the overlap walls in normal relationship to each other and by folding the downstream border member 304 into a position normal to the sidewalls, the rectangular flow-through frame 303 can be provided. Once this has been accomplished, a first set of rib members in the form of spaced parallel rods 306 having triangular V-shaped cross sections can be fastened at their extremities to the downstream border member 304 of the unit assembly 303. It is to be understood that any suitable fastening means such as stapless or glue can be used. With the spaced parallel rods properly in position, the partially assembled unit is ready to receive the pleat contour support means. The pleat contour support means comprises a series of separate, longitudinally extending spaced parallel strips 307 which can be made from some sturdy, pliant material such as carboard or chipboard. Each of these strips includes a plurality of aligned diamond-shaped sections 308 joined to one another by rib sections 309. The diamond-shaped sections 308 are each provided with a fold line 311 so that each strip can be folded back and forth upon itself intermediate its diamond-shaped sections to form a plurality of spaced tapering pleat contour tabs 312 with successive rib sections 309 being intermediate the tabs and substantially contiguous to form a longitudinally extending rib member of a second set of rib members. With each of strips 307 so set up to form the pleat contour tabs 312 it only is necessary to nest the base portions of tabs 312 in the V-shaped notches afforded by rods 306, it being noted that rib sections 309 are of a length equal to the spacing of rod members 306 on frame 303. Once the base of tabs 312 of folded strips 307 are in nesting engagement with the V-shaped sections of rods 306, the unit support frame is properly set up to receive pleated filter medium 380. In this connection it is again to be noted that rib sections 309 are contiguous to each other to form the second set of rib members to receive the crests of the downstream face of the filter medium at the upstream side of the frame. The filter medium 380 can be a continuous strip of suitable filter medium— for example, a 50 FG fiber glass material can be used. Medium 380 is inserted in pleated form in frame 303 so as to be supported at its upstream crests by the rib members 309 of the second set of rib members, along its lateral sides by tabs 312 and at its valleys by the rib members 306 of the first set of rib members. To prevent any bypassing of the fluid stream to be filtered by medium 380, the edges and ends of the medium can be sealed to the inside walls of the frame with the aid of a suitable adhesive known in the art. Once the medium has been appropriately inserted, the upstream border members 304 (not disclosed) can be folded over into position and the extremities of the rib members of the second set of rib members fastened thereto by staples or by gluing. It is to be noted that throughout the set-up operations the sides and border members also can be fastened by a suitable gluing or by staples.

From the foregoing description, it can be seen that by employing the features of the present invention it is possible to rapidly assemble and erect a unit filter assembly structure which is straightforward and economical, which is readily installable, and which affords a maximum of support with a minimum of resistance.

The invention claimed is:

1. A unit filter assembly comprising a flow-through frame including an encompassing wall having opposed portions and having an upstream dirty fluid inlet and a downstream clean fluid outlet; a filter medium disposed in said frame between said inlet and said outlet in pleated form across the fluid stream to be treated to provide a plurality of filter pleats; a first set of spaced substantially parallel generally thin narrow rib members having opposed ends thereof fixed to and extending between the downstream edges of said opposed portions of said encompassing wall of said frame adjacent said downstream clean fluid outlet; pleat contour support means supported by and extending from said first set of rib members toward said upstream dirty fluid inlet of said frame; said pleat contour support means tapering inwardly toward the upstream crests of said pleats of said pleated filter medium in substantial contact with the downstream face of the lateral sides of said pleats to maintain said pleats in preselected tapered contoured form against the pressure of the fluid stream to be treated; and a second set of spaced parallel generally thin narrow rib members supported by said pleat contour means to extend parallel the crests of said pleats between the walls of said frame in nesting engagement with the downstream face of the crests of said pleats of said medium adjacent said upstream dirty fluid inlet; wherein said pleat contour support means and said second set of rib members are integral with each other and separable from said flow-through frame; said pleat contour support means and said second set of rib members comprising a plurality of separate longitudinally extending spaced parallel strips each including a plurality of aligned diamond-shaped sections joined to one another by rib sections, said strips each being folded back and forth upon itself intermediate its diamond-shaped sections to form a plurality of aligned spaced tapering pleat contour support tabs with successive rib sections intermediate said tabs substantially contiguous to form a longitudinally extending rib member of said second set of rib members; said first set of rib members comprising a plurality of spaced parallel rods extending in a direction transverse the direction of extension of said rib members of said second set of rib members to support the base of said pleat contour tabs, said rods being fastened at their extremities to opposite walls of said open-ended frames along the downstream side thereof.

2. The apparatus of claim 1, said rods having longitudinally extending body portions of triangular cross section each arranged to receive in nesting engagement therewith the base of said aligned pleat contour support tabs.

3. A unit filter medium support frame blank which when erected serves to firmly support a fluid filter medium in pleated fashion across a fluid stream to be treated comprising: an integral blank of sturdy, pliant material having a rectangular face panel bounded on its opposite sides by a first pair of spaced parallel fold lines and a second pair of spaced parallel fold lines normal to said first pair of fold lines to provide first and second pairs of opposite side wall portions of an encompassing wall for said filter frame integral with said face panel, said side wall portions having overlap portions cooperating with the extremities thereof to permit adjacent extremities to be joined in sealed relationship when said side wall portions are erected normal to said face panel, said face panel being scored to provide a plurality of spaced parallel sections integral with the face panel and displaceable from a plane determined by the downstream edge of said encompassing wall when said wall is in erected position to provide a plurality of flow through passages in said panel defined by a first set of spaced substantially parallel generally thin narrow rib members integral with and extending between the downstream edges of said opposed side wall portions of said encompassing wall of said frame, said displaceable sections affording longitudinally extending pleat contour means which when displaced normally from said rib members extend in longitudinal parallel relationship with said rib members to provide inwardly tapering pleat contour supports for the downstream lateral sides of the pleats of filter medium to be supported.

4. The unit filter medium support frame blank of claim 3, wherein said parallel sections are in the form of overlapping blunted triangles with the longitudinally extending sides thereof scored to provide pleat contour means in the form of sets of spaced parallel rib pairs integral at their base portions with said first set of rib members of said face panel, each set of pleat contouring rib pairs determining an intermediate strip of material integral with said pleat contour rib pairs at the apex portions thereof, said intermediate strips of material forming a second set of spaced parallel rib members supported by said pleat contour rib pair sets to extend between the walls of said frame and to nest with the downstream face of the crests of the pleats of filter medium to be supported.

5. The unit filter frame blank of claim 3, wherein said parallel sections are in the form of overlapping blunted triangles scored to be separable from each other to provide a series of longitudinally extending successive blunted triangular tabs, each integral at its base portion with said first set of rib members of said face panel and displaceable therefrom to provide pleat contouring inwardly tapering contact with the downstream face of the lateral sides of the pleats of filter medium to be supported thereby, said tabs of each section having aligned slots to receive a rib of a second set of pleat supporting rib members.

6. The unit filter frame blank of claim 3, wherein said parallel sections are each scored in spaced parallel rows of longitudinally extending spaced and aligned slits with the slits of one row offset from those of an immediately adjacent row to afford an expandable, lattice-like pleat contour means integral with said first set of rib members of said face panel and displaceable from a plane determined by the downstream edges of said encompassing wall when said wall is in erected position to provide pleat contouring inwardly tapering contact with the downstream face of the lateral sides of the pleats of filter medium to be supported thereby, said expandable lattice-like pleat contour means forming at the apex portions thereof a second set of spaced parallel rib members to nest with the downstream face of the crests of the pleats of filter medium to be supported.

References Cited

UNITED STATES PATENTS

| | | | |
|---|---|---|---|
| 2,058,669 | 10/1936 | Dollinger | 55—521 X |
| 2,138,874 | 12/1938 | Myers. | |
| 2,423,741 | 7/1947 | Vokes et al. | 55—500 X |
| 2,989,145 | 6/1961 | Goodloe | 55—521 X |
| 3,125,427 | 3/1964 | Smith et al. | 55—521 X |
| 3,144,315 | 8/1964 | Hunn | 55—521 X |
| 3,183,286 | 5/1965 | Harms | 55—497 X |
| 3,222,850 | 12/1965 | Hart | 55—500 |
| 3,246,457 | 4/1966 | De Baun | 55—521 X |

FOREIGN PATENTS

| | | |
|---|---|---|
| 482,543 | 3/1938 | Great Britain. |

REUBEN FRIEDMAN, *Primary Examiner.*

C. DITLOW, *Assistant Examiner.*